Jan. 31, 1956 D. S. HARRIS 2,732,894

FOLDABLE CLOSURE

Filed July 24, 1953 4 Sheets-Sheet 1

INVENTOR.
Donald S. Harris
BY
Clifford C. Bradbury
Attorney

FOLDABLE CLOSURE

Filed July 24, 1953

INVENTOR.
Donald S. Harris
BY
Clifford C. Bradbury
Attorney

Jan. 31, 1956 D. S. HARRIS 2,732,894

FOLDABLE CLOSURE

Filed July 24, 1953 4 Sheets-Sheet 3

INVENTOR.
Donald S. Harris
BY
Clifford C. Bradbury
Attorney

Jan. 31, 1956 D. S. HARRIS 2,732,894

FOLDABLE CLOSURE

Filed July 24, 1953 4 Sheets-Sheet 4

INVENTOR.
Donald S. Harris
BY Clifford C. Bradbury
Attorney

United States Patent Office 2,732,894

Patented Jan. 31, 1956

2,732,894

FOLDABLE CLOSURE

Donald S. Harris, New Castle, Ind., assignor to New Castle Products, Inc., New Castle, Ind., a corporation of Indiana Application July 24, 1953, Serial No. 370,062

26 Claims. (Cl. 160—84)

This invention relates generally to a foldable door or partition having a flexible covering.

One of the objects of this invention is to simplify the manufacturing methods of such doors or partitions, thereby to materially reduce the cost of manufacture.

A further object of the invention is to simplify the installation of folding doors or partitions so that with simple instructions they may be installed without expert or trained artisan.

As a part of the simplification, slides have been substituted for rollers for supporting the lead posts and intermediate portions of the folding door, and the covering material has been provided with snap devices for attaching it to the collapsible framework.

Heretofore, covering materials had to be selected which had very little expansion and contraction with changes in temperature or humidity. A part of my invention resides in the provision of spring means for taking up slack and permitting shrinkage in the covering material to keep it taut on the collapsible frame and still permitting a considerable amount of expansion and contraction due to humidity and temperature changes.

A further feature of my invention resides in a novel spring metal member for quickly attaching and readily detaching the slides to and from the lead posts.

Another feature of my invention consists in shaping the crossed lazy tong links so that they stack higher at the midway pintles than at the end pintles. To accomplish this, the lineal center line of each link slopes either downwardly or upwardly toward its ends, depending upon whether the link is on top or on the bottom at the midway pintle. This construction permits the use of bifurcated hinges at the ends of the crossed links without the use of greater width of material than necessary for strength.

Another feature of my invention consists in the provision of compound abutting devices surrounding the pintles at the lead and hinge posts for aligning the door with the posts, both when the door is collapsed and when it is expanded.

Another feature of my invention is the provision of a spring metal stop and retainer for preventing the lead posts for double doors from being moved beyond the desired central position, and for frictionally restraining the movement of the lead posts away from the midway positions.

A still further feature of my invention resides in the form of seal between double sliding doors and the method of attaching these seals to the lead posts, the seals being of flexible rubber, and adapted, when inserted in place in the lead posts, to hold the edges of the covering material in place on the lead posts. The sealing members are reversible so that the same shaped sealing member may be used on each of the doors. This makes it possible to sell complete doors as standard units, and permits them to be installed either as single doors or double doors. When installed as single doors, a channel member into which a sealing member like that on the lead posts is attached to the vertical wall of the opening for registration when the door is closed with the sealing member carried by the lead post.

Other features of my invention are shown in the accompanying drawings and are set forth in the following specification and described in the accompanying claims.

Figure 1:
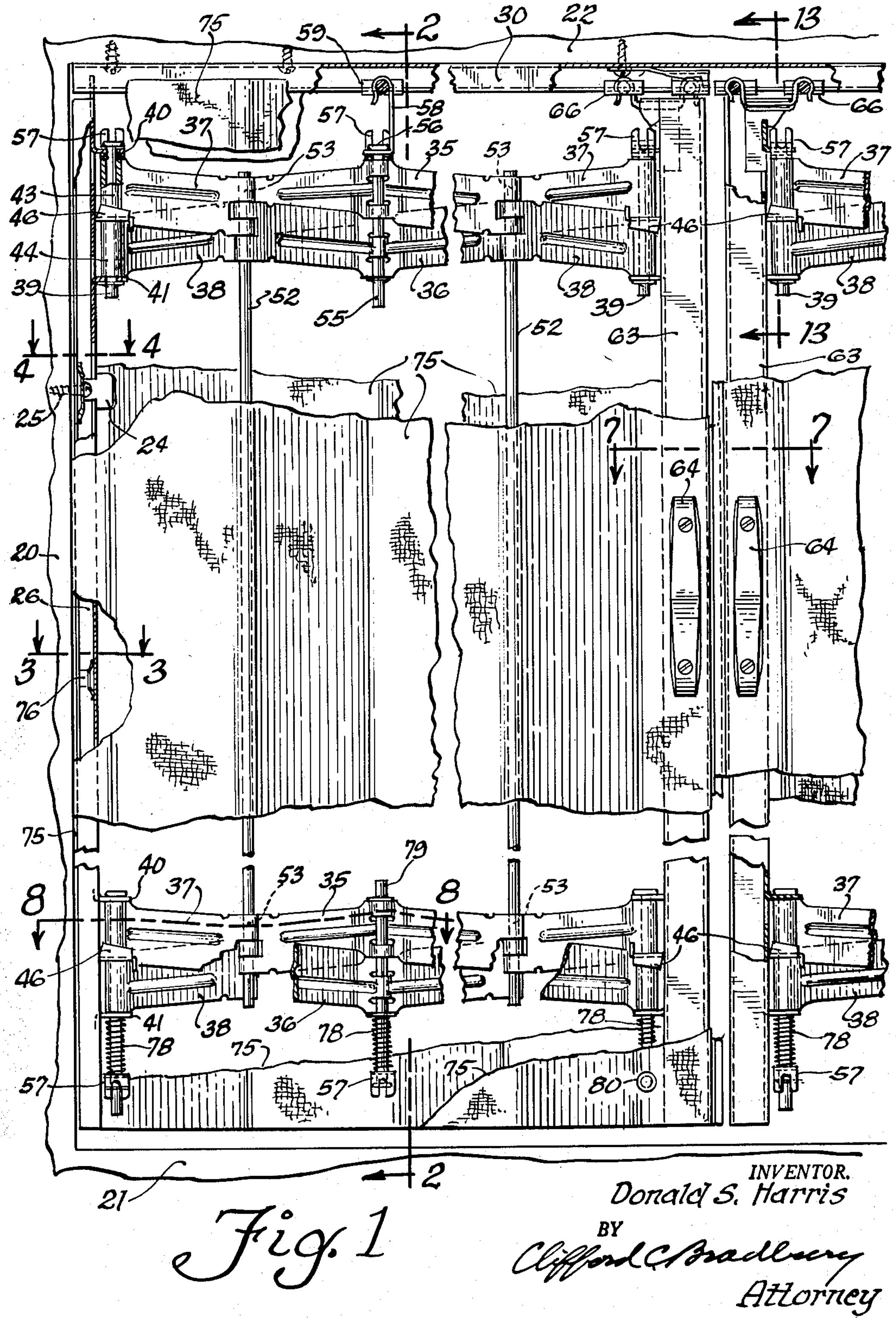
Fig. 1 is a segmental elevation, partly in section, of a pair of double doors, showing the method of attachment of the hinge post to one wall of the opening, and the method of attachment of the top channel to the top wall of the opening.
Figure 2:
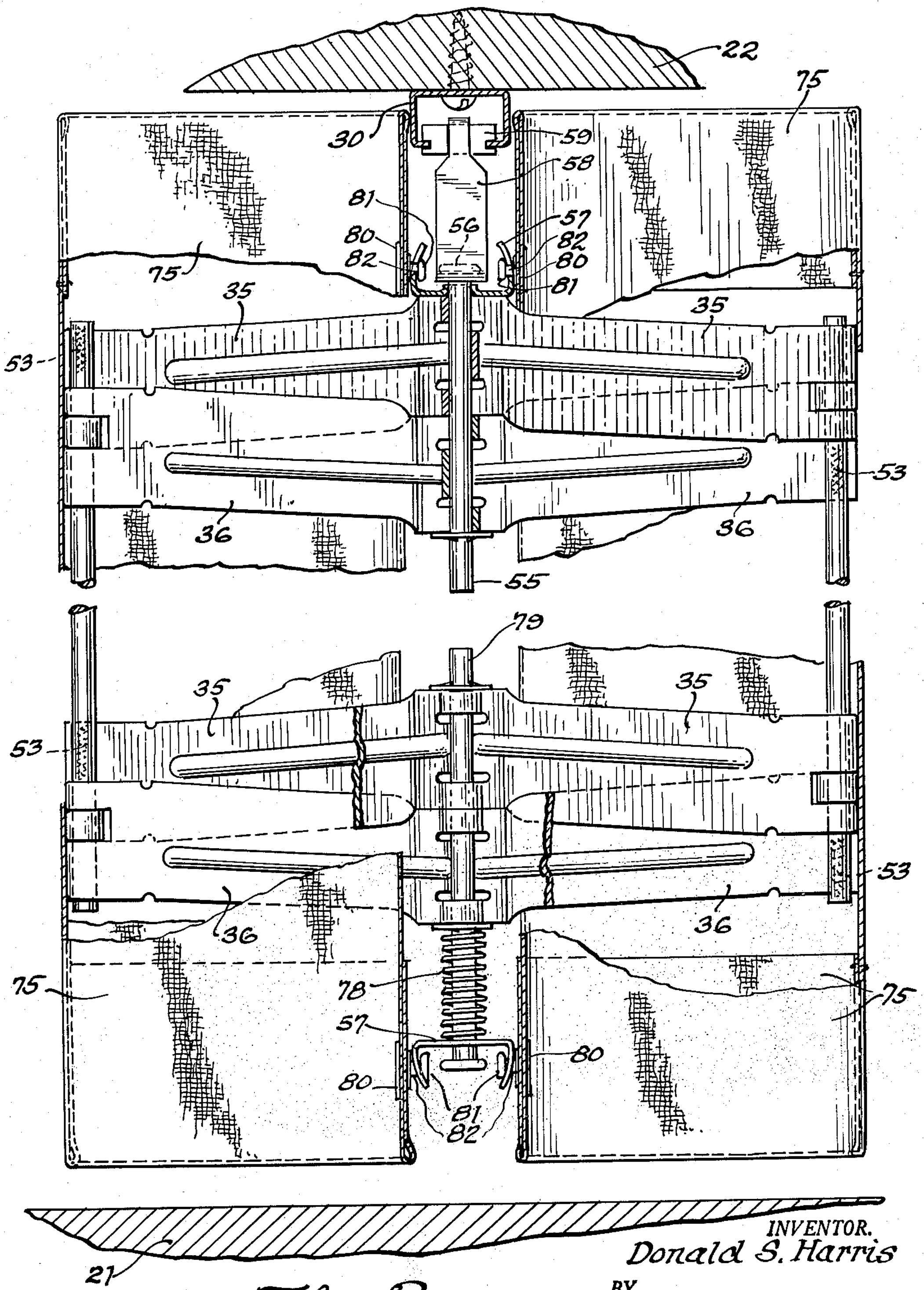
Fig. 2 is a view partly in section taken on the line 2—2 of Fig. 1, but with the door collapsed and looking in the direction of the arrows.

Referring to Figs. 1 and 2, the opening to be closed is partially defined by a jam 20, a floor or sill 21 and a header 22. A plurality of spring metal members 24 are fastened to the jam 20 in vertical alignment, the fastening means being here illustrated as wood screws 25.

Figures 3, 4, 5, 6, 7, 8:
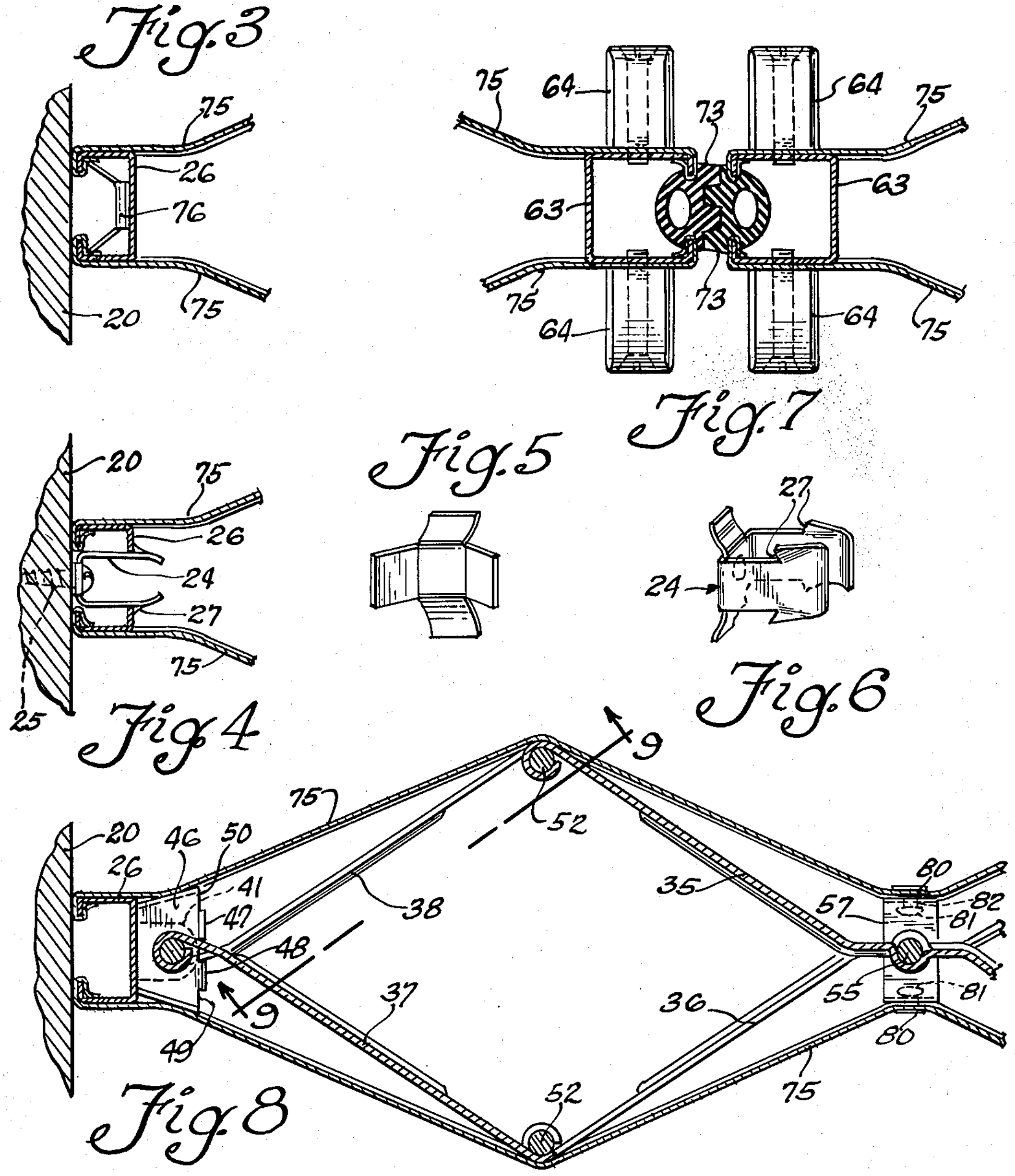
Fig. 3 is a section through the vertical hinge post of the door, showing the method of attaching the fabric to the hinge post.
Fig. 4 is a like section taken at a different level showing the method of attaching the hinge post to the vertical wall of the opening.
Fig. 5 is a perspective of the spring member shown in Fig. 3 and used for holding the covering material onto the hinge posts.
Fig. 6 is a perspective of the spring member shown in Fig. 4 and used for removably attaching the hinge post to one wall of the opening.
Fig. 7 is a section through two lead posts of double doors showing the rubber sealing members and their use in attaching the covering material to the lead posts.
Fig. 8 is a section through one of the half hinge members and through the covering showing the method of attaching the covering material to the lazy tongs frame structure, and the method of mounting the lazy tongs frame member to the hinge posts.
Figure 9:
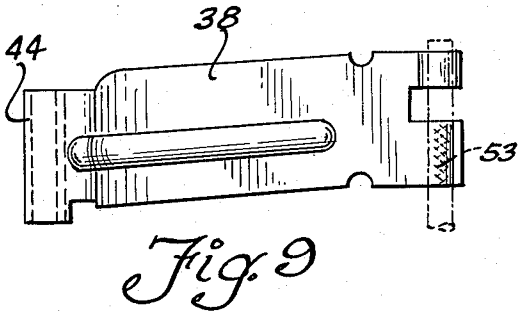
Fig. 9 is a view taken in the direction of the arrows on the line 9—9 of Fig. 8, but with a part of one plate omitted.
Figure 10:
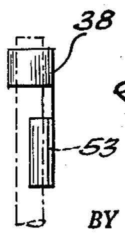
Fig. 10 illustrates the structure of the hinge end of the closed lazy tongs plates showing spot welding of the end of the hinge plate to the hinge pivot pins.

A hinge post 26 of channel construction, as illustrated in Figs. 3 and 4, is secured to the jam 20 by means of the spring metal members 24, the posts 26 being provided with rectangular openings through which the ends of the spring metal members 24 extend when the hinge post is pressed against the jam. One spring metal member 24 is shown in perspective in Fig. 6, wherein it will be seen that ears 27 spring outwardly to engage the outer surface of the hinge post 26 to prevent the hinge post from moving away from the jam. However, the hinge post may be removed from the jam without difficulty by pressing inwardly upon the two ends of the spring metal member 24, thus moving the ears 27 free of the wall of the hinge post 26.

Figures 13, 14, 16, 17, 18:
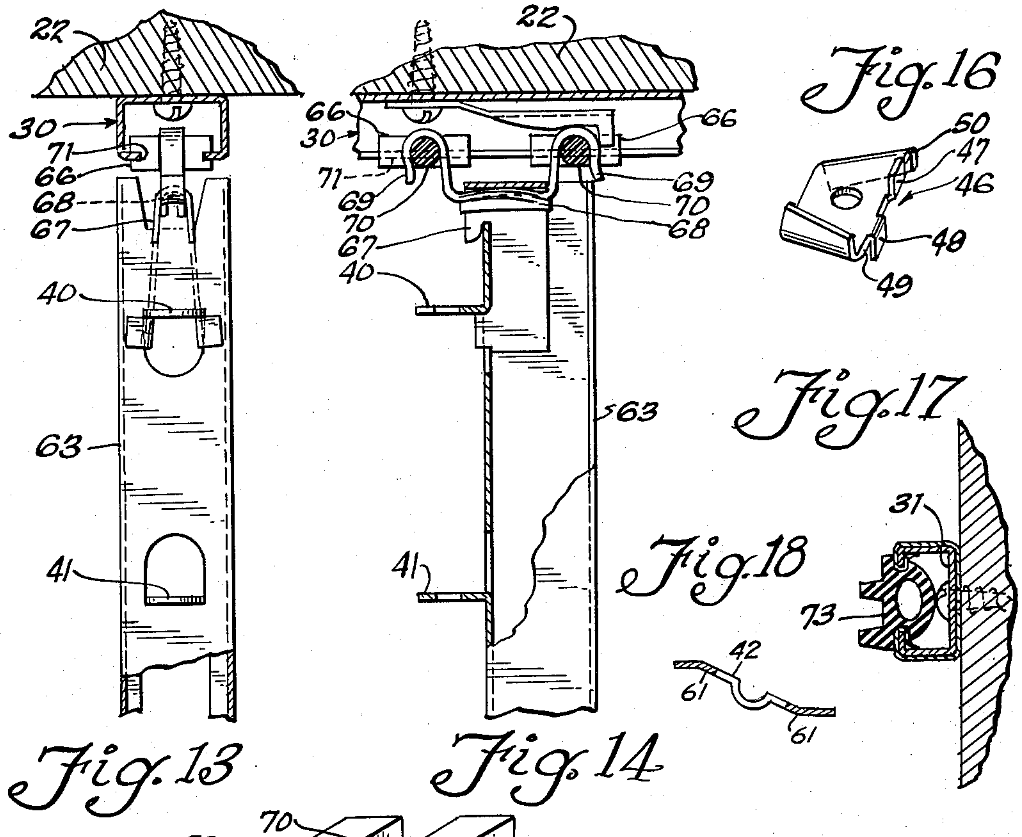
Figs. 13 and 14 are views partly in section showing the attachment of the slide blocks to the top of the lead posts.
Fig. 16 is a perspective of the compound abutting device (shown in Fig. 1) for aligning the door with the hinge post and the lead post with the door.
Fig. 17 is a section showing the method of attaching the rubber sealing member to the stationary door channel when a single door is used.
Fig. 18 is a section on the line 18—18 of Fig. 11.

A top channel 30 is attached to the header 22 by means of screws passing through holes in the web portion of the channel. This channel is of the same general dimension as the hinge post 26, but whereas the hinge post is attached to the jam with the flanges facing the jam, the channel 30 is fastened to the header with the flanges extending downwardly. The other jam defining a part of the opening, but not shown in the drawing, is provided either with a hinge post like 26 for carrying a second door where double doors are used, or with a vertical post like the top channel 30 when a single door is used. A section of such a channel 31 is shown in Fig. 17.

The door frame comprises superposed full length crossed links 35 and 36 and half length links 37 and 38. The half links 37 and 38 are pivoted to the hinge post by short pintles 39 which extend through brackets 40 and 41 bent outwardly from the web of the hinge post 26 and perforated with aligned openings for receiving the short pintles 39. The half links 37 and 38 are of pressed metal with hinge eyes 43 and 44 formed entirely across the breadth of the metal of the half links and curled to fit closely about the pintles 39. A compound stop member 46, shown in perspective in Fig. 16, is supported between the eyes 43 and 44. The function of the stop member 46 is to align the door frame with the hinge post, both when the door frame is collapsed and when it is expanded. The functioning of this compound stop member may be seen in Fig. 8, wherein the abutment 47 turns upwardly to contact the upper link section 37, and the abutment 48 turns downwardly to contact the half link 38 when the door frame is in the expanded position, shown in Fig. 8. When the door frame is in its collapsed position, the outer abutment 49 of the compound stop 46 strikes the face of the half link 37, and the outer abutment 50 strikes the face of half link 38 to align the door frame with the hinge post. The ends of the half links 37 and 38 are provided with bifurcated hinge sections for connecting with the ends of the full length hinge sections 36 and 35, respectively. The pintle 52 extends not only through the bifurcated hinge sections of half plate 37 and full plate 36 located at the top of the door frame, but also through similar bifurcated hinge sections of half plates 37 and full plates 36 located at the bottom of the door frame, and in order that the half plates 37 and full plates 36 at the top and bottom of the door will move always in the same vertical planes, the half links 37 at the top and bottom of the pintle are welded to the pintle 52 at the points 53.

This attachment may be a spot weld, or it may be either an arc or gas weld. When spot welding is used, the hinge eye to be spot welded to the pintle is curved only part way around the pintle so that the spot welding machine can contact directly with the pintle and with the half eye of the link. When gas or arc welding is used, the links may be provided with full eyes as the welding will take place at the ends of the eyes.

Figure 15:
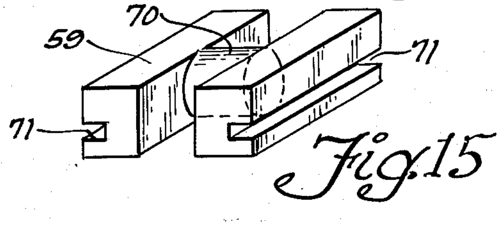
Fig. 15 is a perspective of one of the slide blocks, preferably made of nylon.

The full links 35 and 36 are pivoted at their midpoints upon short pintles 55. Each of the pintles 55 is provided with a head 56 which engages a slotted U-shaped spring metal member 57 for holding the covering material on the frame in a manner to be hereinafter described. Certain of the short pintles 55 may also engage the horizontal part of an L-shaped hook 58 which hangs over a part 70 of a slide member 59, shown in Figs. 1 and 2, and shown in perspective in Fig. 15. This hook 58 and slide member 59 are used only as an intermediate support for doors provided for openings of considerable width, the purpose being to prevent the sagging of the intermediate part of the door.

Figure 11:
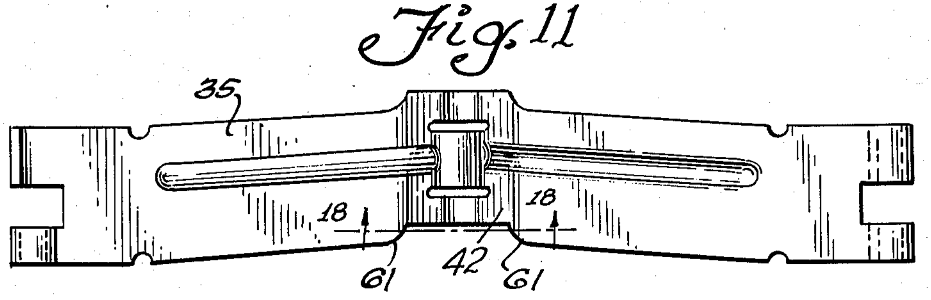
Fig. 11 is an elevation of one of the crossed lazy tongs links.

As shown more particularly in Fig. 11, each of the cross-links forming the door frame is sloped from its midportion toward the ends, and each is provided with abutments 61 extending beyond the hinge portion for the midpart of the links.

Figure 12:
Fig. 12 is a plan of one of the crossed lazy tongs links.

As shown in Fig. 12, the wing portions of the full links are offset from one another into parallel planes, and the biased or angle portion 42 of each plate connecting the offset portions of the plate through the hinge section are likewise slightly offset so that opposite faces of parts of the angle portion lying on opposite sides of the hinge eye lie in the same plane, the purpose of this being that when two like plates are reversibly pivoted on the same pintle, the portions 61 of the two plates which are parts of the angle portions 42 will engage one another face to face to prevent the hinged members from opening beyond a predetermined position (see Fig. 8).

The lead post 63 of each door frame is constructed essentially like the hinge post, excepting that the channel is preferably deeper to provide more space for the attachment of operating handles 64, which are preferably screwed to the channel after the covering material has been applied to the door frame. A double slide member 66 is attached to the top of each lead post by means of a spring member 67 which snaps into the top of the lead post. This member 67 partly surrounds the cylindrical portion 68 which connects two opposite facing hooks 69 which engage cylindrical portions 70 of the slide blocks 66. These slide blocks are essentially like the slide blocks 59, illustrated in Fig. 15, and are preferably made of a plastic material such as nylon. The grooves 71 in the sides of the slide blocks 66 engage the flanges of the top channel 30 whereon they slide freely, smoothly and quietly.

Where two parts of a double door meet, it is desirable that a seal be provided, and it is also desirable that such a seal be provided where the lead post of a single door meets the jam. In order that the same seal may be used on both doors and on the jam, I provide the seals 73 with two gear-tooth like vertical projections offset from the center plane of the door just sufficiently that when two like seals are brought together, the doors are aligned one with the other, or if a single door is used, it is aligned with its jam stop. These seals are preferably made of comparatively soft rubber which performs the function of holding the fabric in place on the lead post by squeezing the fabric around the edges of the flanges on the lead post channel or on the abutment post channel as the case may be.

All of the end hinge pins 52 extend the full length of the door and are of stiff material and welded to corresponding upper and lower hinge plates so that all of the lower hinge plates are required to move in the same planes with the corresponding upper hinge plates when the door is opened or closed. By this arrangement, the door may be opened or closed by pushing at any position from the top to the bottom of the door. The handles 64, however, are usually applied at a convenient height, and the door is ordinarily opened or closed by the handles.

The fabric 75 or other flexible material which covers the door frame is folded about the hinge post and held in position thereon by a plurality of spring members 76, Figs. 3 and 5, though any other suitable means of attaching the fabric to the hinge post, even that of gluing may be used. Heretofore it has been customary to attach the fabric somewhat permanently to the door frame, and for this to result in a satisfactory door, requires the use of fabric which has the least possible change in size due to temperature and humidity changes. In accordance with my invention, however, the fabric is attached to the door frame in such a way that it is kept stretched taut from top to bottom of the door by means of a novel fastening arrangement, together with springs 78 located on the bottoms of the lower pintles 79 and arranged to apply downward pressure upon the U-shaped spring members 57 which are attached to the fabric by means of fasteners 80 riveted or otherwise secured to the fabric and each having a head 81 with a neck portion 82 engaged within the slot in the spring member 57. The top spring members 57 face upwardly and the bottom spring members 57 face downwardly so that the springs 78 not only hold the necks in the slots but also stretch the covering material from top to bottom. The covering material is not attached to the frame between the hinge post and lead post at any other points excepting by the spring members 57, and with this structure, shrinkage and expansion are compensated for and wrinkles in the covering material are prevented.

Since folding doors as herein described are not usually guided at the floor, it is important that as much resistance to side movement of the bottom of the door be provided as is consistent with cost of material used. By the use of the herein described collapsible door frame, as much rigidity is obtained as with former structures using much wider lazy tongs plates. This results from the bifurcation of the hinges at the ends of the plates forming each extensible lazy tongs series and from the downward sloping of the upper plates of each series from the centers toward the ends and the upward sloping of the lower plates of each series from the centers toward the ends with the eyes of serially adjacent plates interconnected, thus preventing slipping of the plates either upwardly or downwardly as side pressure is applied to the lower part of the door.

Although my invention is illustrated and described with respect to a single embodiment, I do not wish to be unduly limited thereto, since many modifications may be made without departing from the spirit or scope of my invention.

I claim:

1. In an articulated lazy tongs structure including in combination a plurality of pairs of crossing plates sequentially connected end to end, vertical pintles for the plates at their crossing points, all plates being alike and having wing portions of the same length, the wing portions of each plate lying in spaced apart parallel planes, there being an angle portion connecting the wing portions of each plate having a bearing structure therein comprising three semi-cylindrical hinge eyes fitting said pintle, the top and bottom hinge eyes extending laterally in one direction and the mid-hinge eye extending laterally in the opposite direction, the angle portion on opposite sides of the hinge eyes being positioned adjacent opposite sides of a common plane, a part of the angle portion of the top plate extending below its lower hinge portion and a part of the angle portion of the lower plate extending above its upper hinge portion so that when two like hinge plates are reversibly mounted on the same pintle parts of the angled portions of the two plates will abut one another face to face to prevent the lazy tongs structure from being extended beyond a predetermined position.

2. In a lazy tongs structure, adjacent plates which cross one above the other, wing portions and intermediate crossing angle portions for each plate, hinge eye bearings in the angle portions, the wing portions being of substantially the same width as the crossing hinge eye bearing portions, the wing portions of the top plates sloping downwardly and the wing portions of the bottom plates sloping upwardly, the end of each meeting wing portion defining spaced eye portions, the wing portions being hinged together with an eye of the wing portion of each plate lying between the spaced eyes of the wing portion of the other plate, the width of the two joined plates at the ends of the wing portions being less than the width of the angle portions of the two crossed plates at their crossing point.

3. In a lazy tongs structure, adjacent plates which cross one above the other, wing portions and intermediate crossing angle portions for each plate, hinge eye bearings in the angle portions, the wing portions being of substantially the same width as the crossing hinge eye bearing portions, the wing portions of the top plates sloping downwardly and the wing portions of the bottom plate sloping upwardly, the wing portions having spaced apart eye portions at their ends, one eye of each being located between two eyes of the other, and a vertical pintle extending through said eyes.

4. In a lazy tongs structure, adjacent plates which cross one above the other, wing portions and intermediate crossing angle portions for each plate, hinge eye bearings in the angle portions, the wing portions being of substantially the same width as the crossing hinge eye bearing portions, the wing portions of the top plates sloping downwardly and the wing portions of the bottom plate sloping upwardly, the wing portions having spaced apart eye portions at their ends, one eye of each being located between two eyes of the other, and a vertical pintle extending through said eyes, the downward slope of the top wings being equal to the width of the upper eye of the lower wing and the upward slope of the lower wing being equal to the width of the lower eye of the upper wing.

5. An articulated lazy tongs structure including in combination a stationary post, a pintle carried by the post, a pair of half plates pivoted one above the other on said pintle, a compound stop member lying between the upper and lower pair of half plates having a hole in it through which the pintle extends, the stop member having a pair of projections, one extending upwardly to engage the upper half plate and the other extending downwardly to engage the lower half plate when the plates are moved to their most extended position and having two additional abutments for engaging the upper and lower half plates when the plates are moved to their extreme collapsed position, whereby the lazy tongs structure is restrained from lateral movement both in its fully expanded position and in its fully collapsed position.

6. In an articulated lazy tongs structure including in combination a movable lead post, a pintle carried by the post, a pair of half plates pivoted one above the other on said pintle, a compound stop member lying between the upper and lower pair of half plates and having a hole in it through which the pintle extends, the stop member having a pair of projections, one extending upwardly to engage the upper half plate and the other extending downwardly to engage the lower half plate when the plates are moved to their most extended position, and having two additional abutments for engaging the upper and lower half plates when the plates are moved to their extreme collapsed position whereby the lead post is held against lateral swinging both in the fully expanded position of the lazy tongs structure and in the fully collapsed position of said structure.

7. In a folding door in combination with a C-section door channel and a C-section stationary channel, of a pair of rubber sealing members of like cross-section each having a pair of longitudinal grooves into which the edges of the channel members fit when the sealing members are squeezed into the hollow portions of the channels, the sealing members being formed to fit one another in sealing contact when the door is closed, and flexible covering for the door and for the stationary channels extending into the hollow portions of the door channel and stationary channel and held in place by the pinching of the groove in the rubber against the covering material as it lies over the edges of the channels.

8. In a folding door in combination a collapsible lazy tongs frame comprising upper and lower crossed and sequentially connected pivoted plates, a flexible cover for the door of such proportions that it folds into the spaces between the plates of the lazy tongs frame, an upwardly slotted metal member carried at the crossing position of the upper lazy tongs plates, a downwardly slotted metal member carried at the crossing position of the lower lazy tongs plates, a spring for pressing said upper and lower slotted members apart, upper and lower fasteners attached to the flexible cover, each having a neck for engagement in one of the slots of said metal slotted members whereby the flexible cover is supported and stretched from top to bottom.

9. A folding door as defined by claim 8 in which aligned pintles pivot the crossing positions of upper and lower lazy tongs plates, and in which the slotted members are carried on said pintles, one above the upper crossed plates and one below the lower crossed plates, and in which the spring surrounds one of said pintles and presses one of said slotted plates away from the crossing position of one of said pair of crossed lazy tongs plates.

10. A folding door as defined by claim 8 in which the spring and the lower slotted member surround the lower pintle below the crossing of the lower lazy tongs plates and press downwardly on the neck of the flexible cover fastener, and in which the upper slotted member is carried by the upper pintle and the upper lazy tongs plates.

11. A folding door as defined by claim 8, in which pintles for crossing positions of the lazy tongs plates are short and in which the pintles for the ends of the lazy tongs plates are long and extend through the upper and lower lazy tongs hinges and are secured to one plate of the upper lazy tongs and to one plate of the lower lazy tongs thereby preventing the springs from moving the upper and lower lazy tongs frames toward one another.

12. In a folding door in combination a C-channel on the under side of the lintel, a slide engaging above and below the two edges of the channel, a horizontal cylindrical part on said slide connecting the two channel edge engaging parts, the axis of the cylinder being substantially in the horizontal plane of the two edges of the C-channel, a door supporting member extending over said cylindrical part under which the cylinder may rock to prevent the slide from binding on the edges of the channel, and a universal bearing between said door supporting member and the folding door.

13. In a folding door in combination a C-channel on the under side of the lintel, a pair of slides engaging above and below the two edges of the channel, a cylindrical part on each slide connecting the two channel engaging parts thereof, a door supporting member extending over the cylindrical parts of each of said slides and holding them in spaced relation with one another, whereby the slides have independent rocking motion with respect to one another, and a universal bearing between said door supporting member and the folding door.

14. In a folding door as defined by claim 13 in combination a spring member attached to the inside of the C-channel and having a stop thereon positively to prevent the slide from moving beyond a predetermined position in engagement with said spring, the spring pressing against a part of the slide to offer some resistance to movement of the slide in a reverse direction away from the said predetermined position.

15. In a folding door in combination a channel forming an end post for the door adapted to lie with its open side against one of the jambs of the doorway, the face of the channel remote from the jamb being provided with a plurality of openings, spring members fastened in aligned positions along the jamb opposite openings through the channel face, the spring members having ends extending through the openings and provided with latches for spring engagement with the outer surface of the channel and with projections beyond the latches for engagement to release the latches.

16. In a folding door in combination a vertical end post of channel cross-section positioned with its open side against a doorway jamb, the opposite side of the channel being provided with a plurality of spaced openings, latches attached to the jamb opposite the openings in the channel, each latch comprising two spring leaves tensioned to spring apart and with catch portions for spring engagement with the outer face of the channel when the channel is pressed against the jamb.

17. In a folding door in combination a vertical end post of channel cross-section positioned with its open side against a doorway jamb, the opposite side of the channel being provided with a plurality of spaced openings, latches attached to the jamb opposite the openings in the channel, each latch comprising two spring leaves tensioned to spring apart and with catch portions for spring engagement with the outer face of the channel when the channel is pressed against the jamb, the catch portions having sloping parts for moving the spring latches toward one another as the post is pressed toward the jamb.

18. In a folding door in combination a vertical end post of channel cross-section positioned with its open side against a doorway jamb, the opposite side of the channel being provided with a plurality of spaced openings, latches attached to the jamb opposite the openings in the channel, each latch comprising two spring leaves tensioned to spring apart and with catch portions for spring engagement with the outer face of the channel when the channel is pressed against the jamb, the catch portions having sloping parts for moving the spring latches toward one another as the post is pressed toward the jamb, and having extensions by which the leaves may be squeezed toward one another to release the post from the jamb.

19. In a folding door in combination a vertical end post of channel cross-section adapted to be positioned with its open side against a doorway jamb, two flexible coverings for the folding door attached one on each side of the vertical end post, the vertical wall of the channel remote from the jamb being provided with a plurality of spaced openings which lie between the two flexible door coverings, spring latches attached to the doorway jamb and adapted to extend through the openings in the channel when the channel is pressed against the jamb, the spring leaves being provided with catches for engagement against the outer face of the channel and with extensions which may be engaged by pressing the flexible door coverings toward one another at the positions of the spring leaves whereby the channel may be released from the door jamb without damaging the flexible door covering.

20. In a folding door in combination, a collapsible frame comprising upper and lower sequentially connected plates, pintles for uniting said plates together to form two extensible units, short vertical pintles from which the plates of said units project toward both sides of the folding door, a flexible cover for the door of such proportions that it folds between the projecting plates when the units are collapsed, vertical pintle rods to which the lateral ends of the upper and lower plates are secured to prevent the upper and lower units from moving toward one another, pairs of co-acting pin and slot devices near the top of the door, one part of each pair carried at the inner pivotal positions of the upper unit and the other part of each pair carried by the flexible cover for hooking the pin and slot devices together by the relative downward movement of the flexible cover, pairs of co-acting pin and slot devices near the bottom of the door, one part of each pair carried at the inner pivotal positions of the lower unit and the other pair of each pair carried by the flexible cover for hooking the pin and slot devices together by a relative upward movement of the flexible cover, springs for pressing apart the upper and lower members of each pair which are carried by the upper and lower units whereby the flexible cover is supported and held taut from top to bottom at its inner folds.

21. A folding door as defined by claim 20, in which one of the co-acting pin and slot devices of each pair is carried by the short vertical pintles.

22. A folding door as defined by claim 20, in which one of the co-acting pin and slot devices of one pair is carried by the short vertical pintle near the top of the door and one of the co-acting pin and slot devices of another pair is carried by the vertically aligned short pintle near the bottom of the door.

23. A folding door as defined by claim 20, in which the pin portions of the co-acting devices are carried by the flexible cover.

24. In a folding door in combination, a collapsible frame comprising upper and lower sequentially connected plates, pintles for uniting said plates together to form two extensible units, short vertical pintles from which the plates of said units project toward both sides of the folding door, a flexible cover for the door of such proportions that it folds between the projecting plates inwardly almost to the short vertical pintles when the units are collapsed, the vertical pintle rods to which the lateral ends of the upper and lower plates are secured serving to prevent the upper and lower units from moving toward one another, pairs of co-acting fastener devices near the top of the door, one part of each pair carried by the short pintles of the upper unit and the other part of each pair carried by the flexible cover at its folds adjacent the short vertical pintles for attachment together to support the upper part of the flexible cover at the middle of its inner fold, pairs of co-acting fastener devices near the bottom of the door, one part of each pair carried by the short pintles of the lower unit and the other part of each pair carried by the flexible cover for attachment together to hold the flexible cover taut from top to bottom.

25. A flexible door defined by claim 24, in which U-shaped members having upturned ends and having their yokes pierced by the upper short pintles carry the fastener parts for the upper short pintles on their upturned ends, and in which U-shaped members having downturned ends and having their yokes pierced by the lower short pintles carry the fastener parts for the lower short pintles on their downturned ends.

26. A flexible door as defined by claim 24, in which U-shaped members having their yokes pivoted on the upper short pintles carry parts of the upper fastener devices on their upturned ends, and in which U-shaped members having their yokes pivoted on the lower short pintles carry parts of the lower fastener devices on their downturned ends.

References Cited in the file of this patent

UNITED STATES PATENTS

| | | |
|---|---|---|
| 1,813,474 | Ward | July 7, 1931 |
| 1,842,734 | Saives | Jan. 26, 1932 |
| 2,220,939 | McGuire et al. | Nov. 12, 1940 |
| 2,373,146 | Shearer | Apr. 10, 1945 |
| 2,379,193 | Shields | June 26, 1945 |
| 2,460,157 | Watkins | Jan. 25, 1949 |
| 2,512,736 | Brenner et al. | June 27, 1950 |
| 2,599,860 | Planeaux | June 10, 1952 |
| 2,667,218 | Collins | Jan. 26, 1954 |